(12) United States Patent
Kato et al.

(10) Patent No.: US 8,830,379 B2
(45) Date of Patent: Sep. 9, 2014

(54) IMAGE PICKUP APPARATUS WITH INTER-FRAME ADDITION COMPONENTS

(75) Inventors: Shingo Kato, Sagamihara (JP); Keigo Matsuo, Akiruno (JP); Hisashi Goto, Suginami-ku (JP)

(73) Assignee: Olympus Corporation, Tokyo (JP)

( * ) Notice: Subject to any disclaimer, the term of this patent is extended or adjusted under 35 U.S.C. 154(b) by 475 days.

(21) Appl. No.: 13/134,644

(22) Filed: Jun. 13, 2011

(65) Prior Publication Data

US 2011/0310266 A1   Dec. 22, 2011

(30) Foreign Application Priority Data

Jun. 22, 2010   (JP) .................................. 2010-141827

(51) Int. Cl.
  *G03B 13/00*     (2006.01)
  *H04N 5/232*    (2006.01)
  *G03B 3/00*     (2006.01)

(52) U.S. Cl.
  USPC .............................. 348/345; 348/354; 396/89

(58) Field of Classification Search
  USPC ................ 348/345–357; 396/79–83, 89–152;
                  250/201.4–201.7; 352/139–140;
                  382/255; 359/696–698
  See application file for complete search history.

(56) References Cited

U.S. PATENT DOCUMENTS

| 7,586,518 B2 * | 9/2009 | Imaizumi .................. 348/208.12 |
| 7,970,270 B2 * | 6/2011 | Moon ........................... 396/117 |
| 8,203,645 B2 * | 6/2012 | Kawarada ..................... 348/354 |
| 2009/0244301 A1 * | 10/2009 | Border et al. ............ 348/208.99 |
| 2010/0124413 A1 * | 5/2010 | Moon ........................... 396/117 |
| 2010/0214452 A1 * | 8/2010 | Kawarada ..................... 348/255 |

FOREIGN PATENT DOCUMENTS

| JP | 07-028121 | 1/1995 |
| JP | 2009-003122 | 1/2009 |
| JP | 2010-008443 | 1/2010 |
| WO | WO2009022634 | * 2/2009 ............. H04N 5/335 |

OTHER PUBLICATIONS

Japanese Office Action, mailed Feb. 12, 2014, issued in corresponding Japanese Patent Application No. 2010-141827.

* cited by examiner

*Primary Examiner* — Tuan Ho
*Assistant Examiner* — Christopher K Peterson
(74) *Attorney, Agent, or Firm* — Kenyon & Kenyon LLP

(57) ABSTRACT

The image pickup apparatus of the present invention includes: an optical imaging system for forming an object image; an image pickup device including a plurality of pixels that photoelectrically converts the object image; a defocus quantity calculation section for calculating a defocus quantity based on a phase difference between a plurality of signals for focus detection obtained from a plurality of pixels for focus detection that respectively receive a light flux that passes through a different pupil region of the optical imaging system; a focusing section for driving the optical imaging system so as to achieve an in-focus state, in accordance with the defocus quantity calculated at the defocus quantity calculation section; an addition practicability determination section for determining a practicability of performing inter-frame addition on a plurality of signals for focus detection before calculating the defocus quantity, based on an analysis result of a signal component of the object image; and an inter-frame addition processing section for performing inter-frame addition based on a determination result of the addition practicability determination section.

5 Claims, 6 Drawing Sheets

IMAGE PICKUP APPARATUS WITH INTER-FRAME ADDITION COMPONENTS

CROSS REFERENCE TO RELATED APPLICATION

This application claims benefit of Japanese Application No. 2010-141827 filed in Japan on Jun. 22, 2010, the contents of which are incorporated by this reference.

BACKGROUND OF THE INVENTION

1. Field of the Invention

The present invention relates to an image pickup apparatus, and particularly to an image pickup apparatus having a focus detection function.

2. Description of the Related Art

In image pickup apparatuses such as digital cameras and the like, a technique to perform focus detection according to a pixel signal outputted from an image pickup device has been proposed. Herein, focus detection refers to, in an image pickup device, detecting a focus position (focusing condition) of an optical imaging system with respect to an object. To be specific, there is proposed a focus detection method called a phase difference detection scheme which performs focus detection according to a phase difference between pixel signals outputted from a plurality of pixels for focus detection, in an arrangement in which pixels for photographing that receive a light flux that has passed through an optical imaging system and output pixel signals, and a plurality of pixels for focus detection that receive only a light flux that has passed through a different pupil region of the optical imaging system and output pixel signals are provided in an image pickup device, respectively.

However, in focus detection by using a phase difference detection scheme, for example, when the object has a low illuminance, and when a large defocus has occurred, the signal level obtained from the focus detection pixel will decline. Moreover, since the S/N ratio will decline in accordance with such a decline of the signal level, a problem will arise in that when a correlation computation is performed simply by performing a gain-up processing, an error will occur in the computation result thereby disabling the performance of suitable focus detection.

On the other hand, for the purpose of avoiding the above described problem, for example, Japanese Patent Application Laid-Open Publication No. 2009-3122 discloses an image pickup apparatus for performing focus detection by using the above described phase-difference detection scheme, which is configured to perform a correlation computation for determining a defocus quantity (focus deviation quantity) on the output signals from pixels for focus detection by using synthesized signals obtained by adding and synthesizing output signals from focus detection pixels which are present in the surroundings of the pixels for focus detection.

SUMMARY OF THE INVENTION

The image pickup apparatus of the present invention comprises: an optical imaging system for forming an object image; an image pickup device including a plurality of pixels that photoelectrically converts the object image; a defocus quantity calculation section for calculating a defocus quantity based on a phase difference between a plurality of signals for focus detection obtained from a plurality of pixels for focus detection that respectively receive a light flux that passes through a different pupil region of the optical imaging system; a focusing section for driving the optical imaging system so as to achieve an in-focus state, in accordance with the defocus quantity calculated at the defocus quantity calculation section; an addition practicability determination section for determining a practicability of performing inter-frame addition on the plurality of signals for focus detection before calculating the defocus quantity, based on an analysis result of a signal component of the object image; and an inter-frame addition processing section for performing inter-frame addition based on a determination result of the addition practicability determination section.

DETAILED DESCRIPTION OF THE PREFERRED EMBODIMENTS

Hereafter, embodiments of the present invention will be described with reference to the drawings.

Figure 1:
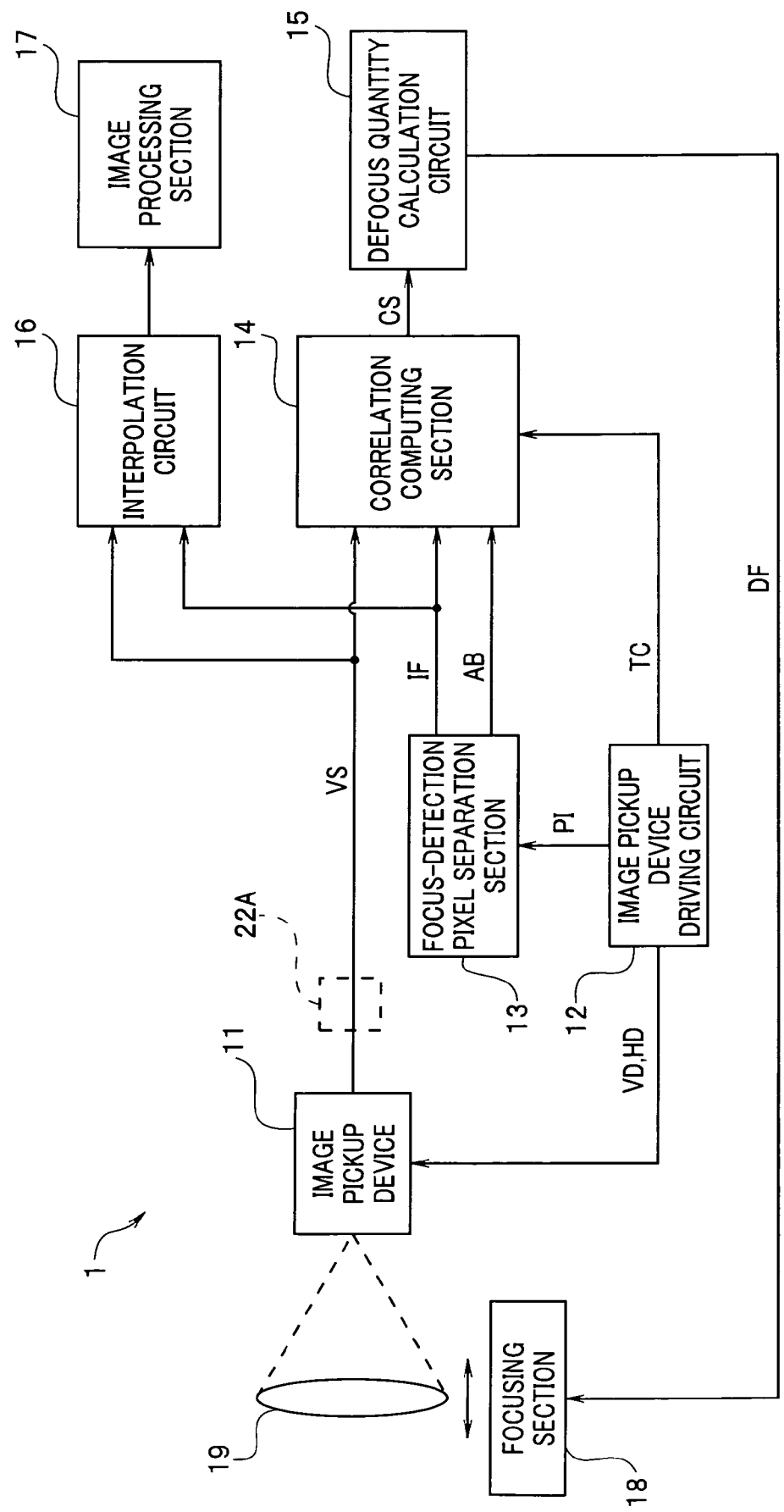
FIG. 1 is a configuration diagram showing a principal part of an image pickup apparatus relating to an embodiment of the present invention.

First, based on FIG. 1, a configuration of an image pickup apparatus relating to an embodiment of the present invention will be described. FIG. 1 is a configuration diagram showing the configuration of an image pickup apparatus relating to the present embodiment.

An image pickup apparatus 1 is configured to include an image pickup device 11, an image pickup device driving circuit 12, a focus-detection pixel separation section 13, a correlation computing section 14, a defocus quantity calculation circuit 15, an interpolation circuit 16, an image processing section 17, a focusing section 18, and an optical imaging system 19 which forms an object image. For example, the image pickup apparatus 1 is a digital camera etc. having an auto focus (hereafter, referred to as AF) function, in which an object image received via the optical imaging system 19 which is an objective optical system is formed on the image pickup device 11, and an image pickup signal from the image pickup device 11 is subjected to image processing at the image processing section 17. Thus, image data is recorded in a recording medium (not shown) etc.

As described later, the image pickup device 11 includes a plurality of pixels for photoelectrically converting an object image. To be more specific, the image pickup device 11 includes pixels for photographing and pixels for focus detection, and is driven by the image pickup driving circuit 12 to output an image signal VS which is a video signal generated by photoelectric conversion.

The image pickup device driving circuit 12 outputs a horizontal synchronization signal HD and a vertical synchronization signal VD to the image pickup device 11, and drives in a predetermined order the plurality of pixels disposed in a 2-dimensional matrix form in the image pickup device 11. Further, the image pickup driving circuit 12 outputs a readout position signal PI which is position information of a readout pixel of the image pickup device 11 to the focus-detection pixel separation section 13 based on the horizontal synchronization signal HD and the vertical synchronization signal VD, as well as outputs a correlation timing signal TC to the correlation computing section 14.

Here, for example, the readout position information PI is a pulse signal having a predetermined timing corresponding to the positions of the plurality of pixels in a matrix form. For example, each of control signals (VD, HD, PI, TC) outputted by the image pickup device driving circuit 12 is outputted in synchronization with the operation of a release button.

The focus-detection pixel separation section 13 is a circuit that generates a pixel type signal PS that indicates the kind of image signal VS from the image pickup device 11 based on the readout position information PI from the image pickup device driving circuit 12 to output it to the correlation computing section 14.

The pixel type signal PS includes a focus-detection pixel indicator signal IF and a pupil indicator signal AB. The focus-detection pixel indicator signal IF is a signal indicating that the image signal VS is a signal of the pixel for focus detection. The pupil indicator signal AB is a signal indicating to which pupil region of the different pupil regions, the predetermined pupil regions A and B in this case, of the optical imaging system 19 the signal of a pixel corresponds. Thus, when the inputted image signal VS is a signal of the pixel for focus detection, the correlation computing section 14 can identify to which pupil region of the pupil regions A and B the signal corresponds, through the pupil indicator signal AB.

Light from the same point of an object is received by a plurality of pixel pairs for focus detection on an image pickup device as light fluxes from the two pupil regions A and B. The plurality of pixels for focus detection are made up of a plurality of pixel pairs, and a micro lens or a light shielding mask corresponding to each pixel is provided in the image pickup device 11 such that one of each pixel pair receives the light flux from the pupil region A, and the other receives the light flux from the pupil region B. The pupil indicator signal AB indicates to which pupil region of the two pupil regions A and B the signal of an image belongs.

The focus-detection pixel separation section 13 includes, for example, a counter for counting pulse signals of readout position information PI, and a storage section for retaining a value corresponding to the position of the pixel for focus detection, and is configured to output a focus-detection pixel indicator signal IF and a pupil indicator signal AB which indicates either of the pupil region A or B when the count value reaches a predetermined value (that is, a value corresponding to the position of the pixel for focus detection).

The correlation computing section 14 receives the inputs of the image signal VS from the image pickup device 11, the focus-detection pixel indicator signal IF and the pupil indicator signal AB from the focus-detection pixel separation section 13, and the correlation timing signal TC from the image pickup device driving circuit 12.

The correlation computing section 14 performs a predetermined correlation computation on the image signals VS from a plurality of pixels for focus detection based on the correlation timing signal TC and outputs a computation result CS to the defocus quantity calculation circuit 15.

The defocus quantity calculation circuit 15 as a defocus quantity calculation section calculates a defocus quantity DF by using the computation result CS of the correlation computing section 14 and outputs it to the focusing section 18. That is, a plurality of signals for focus detection are obtained from a plurality of pixels for focus detection which respectively receive the light flux that has passed through the two pupil regions A and B of the optical imaging system 19, and a phase difference is calculated from the computation result (correlation values) obtained from the correlation computation using the aforementioned signals for focus detection. Then, the defocus quantity calculation circuit 15 calculates a defocus quantity based on the phase difference.

The focusing section 18 drives the optical imaging system 19 according to the defocus quantity DF calculated at the defocus quantity calculation circuit 15 so as to achieve an in-focus state, thereby realizing an AF function of the image pickup apparatus 1.

The interpolation circuit 16 performs interpolation processing on the image signal from the image pickup device and outputs the interpolated image signal to the image processing section 17. To be specific, since a pixel for focus detection cannot be used as a pixel for photographing, the interpolation circuit 16 generates an image signal of the pixel at the position of the pixel for focus detection by the interpolation using signals of surrounding image pickup pixels.

The image pickup apparatus 1 is configured such that the execution of photographing processing is instructed according to an operation signal from an operation section (for example, a release button of digital camera) which is not shown, and focus detection is performed during the execution of the photographing processing thus executing an AF function.

Figure 2:
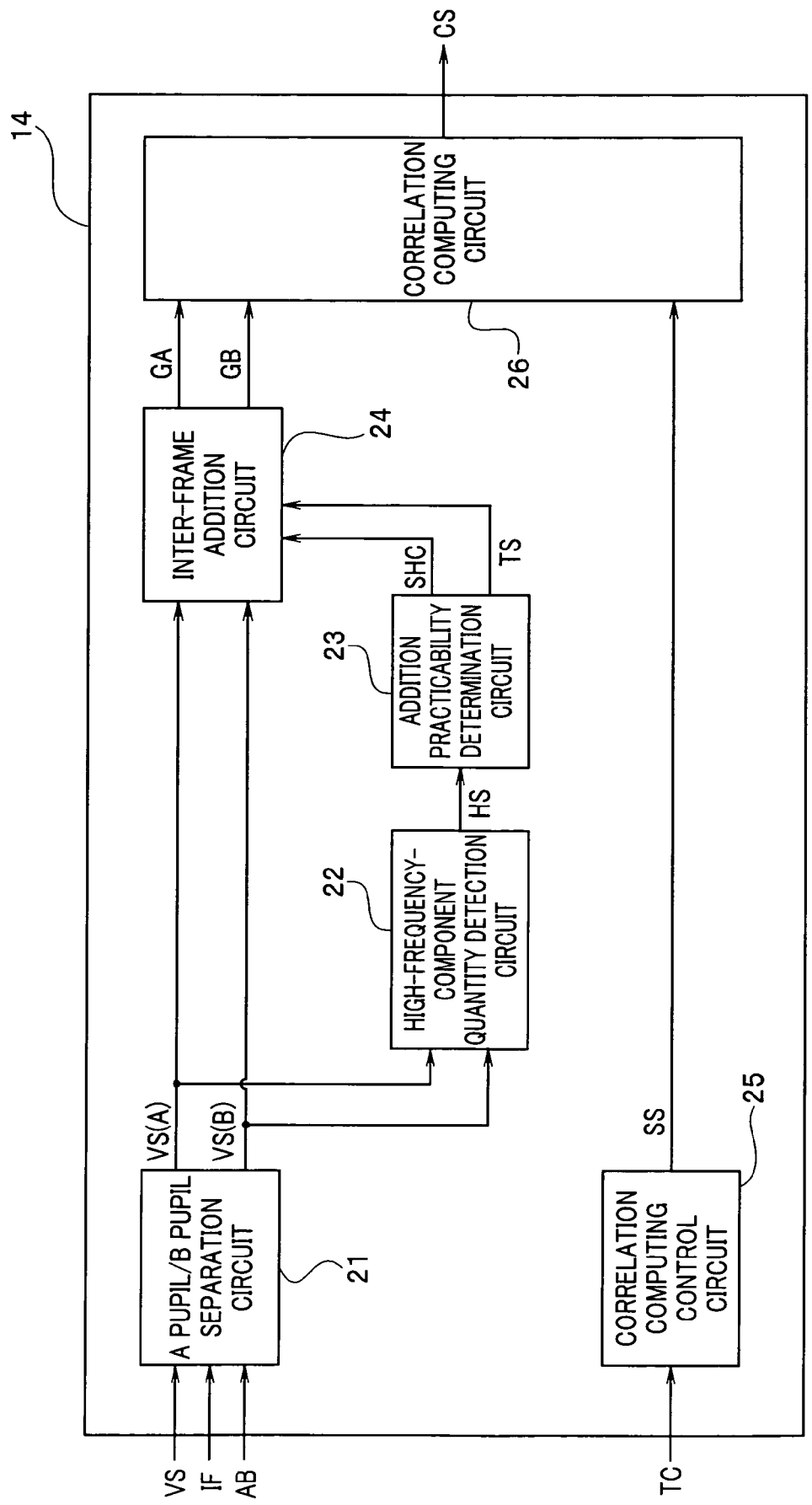
FIG. 2 is a block diagram showing a specific example configuration of a correlation computing section relating to an embodiment of the present invention.

FIG. 2 is a block diagram showing the configuration of the correlation computing section 14. The correlation computing section 14 is configured to include an A pupil/B pupil separation circuit 21, a high-frequency-component quantity detection circuit 22, an addition practicability determination circuit 23, an inter-frame addition circuit 24, a correlation computing control circuit 25, and a correlation computing circuit 26.

The A pupil/B pupil separation circuit 21 receives the inputs of an image signal VS, a focus-detection pixel indicator signal IF and a pupil indicator signal AB. The A pupil/B pupil separation circuit 21 determines that the inputted image signal VS is an image signal of the pixel for focus detection based on the focus-detection pixel indicator signal IF. Further, the A pupil/B pupil separation circuit 21 determines which pupil region of the two pupil regions A and B the image signal VS of the pixel for focus detection corresponds to based on the pupil indicator signal AB. Thus, the A pupil/B pupil separation circuit 21 outputs only the image signal VS for the pixel for focus detection separately for the pupil regions A and B to the high-frequency-component quantity detection circuit 22 and the inter-frame addition circuit 24 based on the focus-detection pixel indicator signal IF and the pupil indicator signal AB.

The high-frequency-component quantity detection circuit 22 detects a high-frequency component quantity on a plurality of image signals VS of the pixel for focus detection, which have been continuously inputted. The high-frequency component quantity is one of the analysis results of the signal component of an object image.

To be specific, a plurality of image signals VS of an A pupil region or a B pupil region are continuously inputted to the high-frequency-component quantity detection circuit 22. The high-frequency-component quantity detection circuit 22 detects a high-frequency component quantity from the continuously inputted plurality of image signals VS. For example, when a plurality of pixels for focus detection are disposed on one line of the image pickup device 11, a plurality of image signals VS of the A pupil region on that line are continuously inputted to the high-frequency-component quantity detection circuit 22. Then, the high-frequency-component quantity detection circuit 22 takes the difference between two continuously inputted image signals VS, and also takes the sum of the differences, thereby allowing the detection of a high-frequency component quantity as an analysis result of the signal component of an object image.

The plurality of image signals VS of the pupil region A or the pupil region B have a larger variation in the amplitude value when the focus is relatively well adjusted, and a smaller variation in the amplitude value when the defocus quantity is large. Therefore, the high-frequency component quantity corresponds to the defocus quantity.

The high-frequency-component quantity detection circuit 22 outputs a detection signal HS in accordance with the quantity of the detected high-frequency component to the addition practicability determination circuit 23. That is, the quantity of the high-frequency component included in the plurality of signals for focus detection obtained from the plurality of pixels for focus detection is outputted from the high-frequency-component quantity detection circuit 22.

Note that the high-frequency-component quantity detection circuit 22 may be configured to detect the quantity of a high-frequency component included in the image signal VS of a pixel for photographing from the image pickup device 11. For example, a high-frequency-component quantity detection circuit 22A may be provided on the output side of the image pickup device 11 as shown by a dotted line in FIG. 1, and the quantity of the high-frequency component included in the image signal VS of a pixel for photographing may be used as the detection signal HS to the addition practicability determination circuit 23.

The addition practicability determination circuit 23 as an addition practicability determination section determines the practicability of inter-frame addition in accordance with the detection signal HS, and outputs an addition practicability signal TS based on this determination to the inter-frame addition circuit 24. Moreover, the addition practicability determination circuit 23 generates and outputs a shift signal SHC which is used for the control of the inter-frame addition circuit 24.

The inter-frame addition circuit 24 as an inter-frame addition processing section performs an inter-frame addition processing on the image signals VS of the pixel for focus detection outputted from the A pupil/B pupil separation circuit 21 according to the addition practicability signal TS. Note that the inter-frame addition processing means a processing which is performed on a plurality of frames, for adding pixels at the same position in the respective frames.

Figure 3:
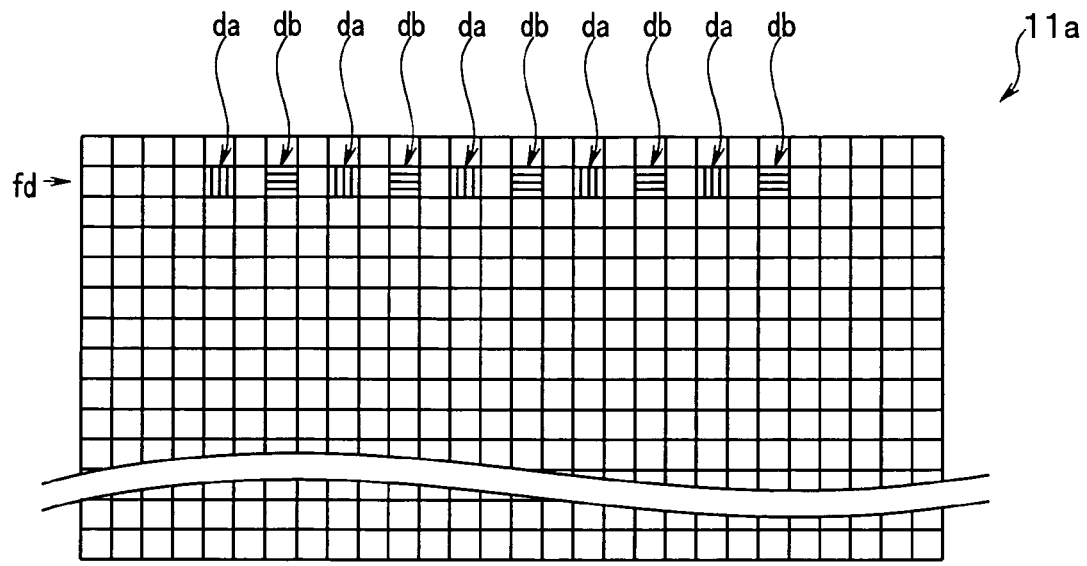
FIG. 3 is a schematic diagram to illustrate a pixel array when pixels for focus detection are provided only in one row in an image pickup plane of the image pickup device relating to an embodiment of the present invention.

FIG. 3 is a schematic diagram to illustrate the pixel array of the image pickup device 11. As shown in FIG. 3, a plurality of pixels is arranged in a matrix form on an image pickup plane 11a of the image pickup device 11.

FIG. 3 shows, as an example, a part of the pixel array of the image pickup device 11 including a plurality of pixels disposed in a matrix form of M×N (M and N are integers). FIG. 3 shows an example of an image pickup device having 28 pixels in the horizontal direction. The image pickup device has 5 pixels da for focus detection that photoelectrically convert the light flux of the pupil region A and 5 pixels db for focus detection that photoelectrically convert the light flux of the pupil region B, in a row fd. A plurality of pixel pairs da, db for focus detection are discretely disposed among the plurality of image pickup pixels in the row fd. Note that since the pixels da and db for focus detection cannot be used as pixels for photographing, preprocessing to generate interpolated pixels from surrounding pixels for photographing is performed to generate image signals for photographing for the pixels at the positions of the pixels da and db for focus detection, as described above.

Figure 4:
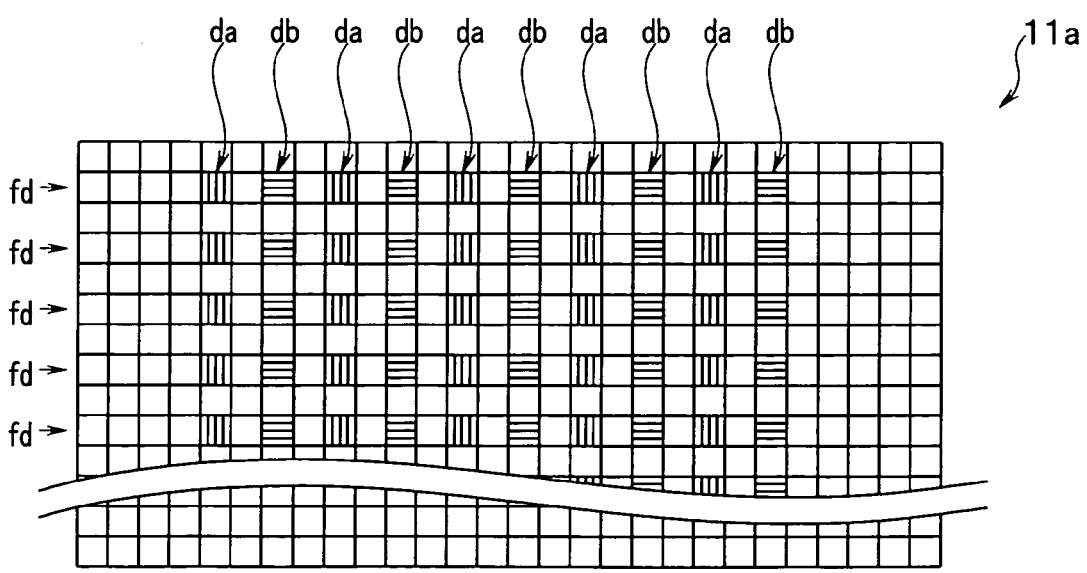
FIG. 4 is a schematic diagram to illustrate a pixel array when pixels for focus detection are provided in a plurality of rows in an image pickup plane of the image pickup device relating to an embodiment of the present invention.

Note that in FIG. 3, although the plurality of pixel pairs for focus detection are provided only in one row of the image pickup plane 11a, they may be provided in a plurality of rows as shown in FIG. 4. FIG. 4 is a schematic diagram to illustrate the pixel array of the image pickup device 11, in which the pixels for focus detection are provided in a plurality of rows of the image pickup plane 11a.

In the row fd, pixels da with vertical stripes receive the light flux from the pupil region A, and the pixels db with horizontal stripes receive the light flux from the pupil region B. That is, 5 pixels da in the row fd receive the light flux from the pupil region A, and 5 pixels db in the row fd receive the light flux from the pupil region B.

Pixels for photographing (pixels other than da and db) exhibit no variation in the phase of signal regardless of the state (in-focus, out-of-focus) of the optical imaging system 19. However, the pixels da and db for focus detection receive the light at positions which are deviated from each other in the left and right direction in accordance with the state (in-focus, out-of-focus) of the optical imaging system 19 due to a micro lens or a light shielding mask which is disposed off-centered as described above. Thus, the image of a pixel for the pupil region A is shifted slightly to the right (or the left) from the image of an image pickup pixel, and the image of a pixel for the pupil region B is shifted slightly to the left (or the right) from the image of an image pickup pixel. The shift quantity increases in accordance with a defocus state, and there is a proportional relation between the shift quantity and the defocus quantity. Taking advantage of this phenomenon and the proportional relationship, an AF function is realized by driving the optical imaging system 19 so as to achieve an in-focus state, in accordance with the detected defocus quantity.

Here, when the high-frequency component quantity is large in the signal of the plurality of pixel pairs da, db for focus detection, the focus is generally in an in-focus state or a state close to an in-focus state. When the high-frequency component quantity is small, the focus is generally in a defocus state.

Referring back to FIG. 2, the addition practicability determination circuit 23 compares the value of the detection signal HS for one frame with a threshold th which is determined in advance based on a value of such as a system noise quantity and a computation bit number, etc.

Then, the addition practicability determination circuit 23 determines that the defocus quantity is small when obtaining a comparison result that the value of the detection signal HS is larger than the threshold th, and outputs an addition practicability signal TS for preventing the inter-frame addition processing from being performed, to the inter-frame addition circuit 24. Moreover, the addition practicability determination circuit 23 determines that the defocus quantity is large when obtaining a comparison result that the value of the detection signal HS is not more than the threshold th, and outputs an addition practicability signal TS for causing the inter-frame addition processing to be performed, to the inter-frame addition circuit 24.

Note that according to the present embodiment, in the case in which pixels for focus detection are provided in a plurality of rows of an image pickup plane 11a as shown in FIG. 4, the addition practicability determination circuit 23 is not necessarily configured to perform the comparison with the threshold th after the values of the detection signal HS corresponding to the pixels for focus detection of all the rows fd are accumulated, but may also be configured to perform the comparison with the threshold th immediately after the value of the detection signal HS corresponding to the pixel for focus detection of the uppermost row fd is inputted. According to such configuration, even when an object that changes from frame to frame is photographed, since the addition practicability signal TS can be outputted at a speed that allows the tracking of the change of the object, the AF function can suitably operate.

Moreover, according to the present embodiment, the addition practicability determination circuit 23 may be configured to output two addition practicability signals TSA and TSB including information regarding the number of frames to be used for the inter-frame addition processing of the below described inter-frame addition circuit 24A according to the comparison result comparing the values of the detection signal HS for one frame with a plurality of thresholds th1, th2, . . . .

Figure 5:
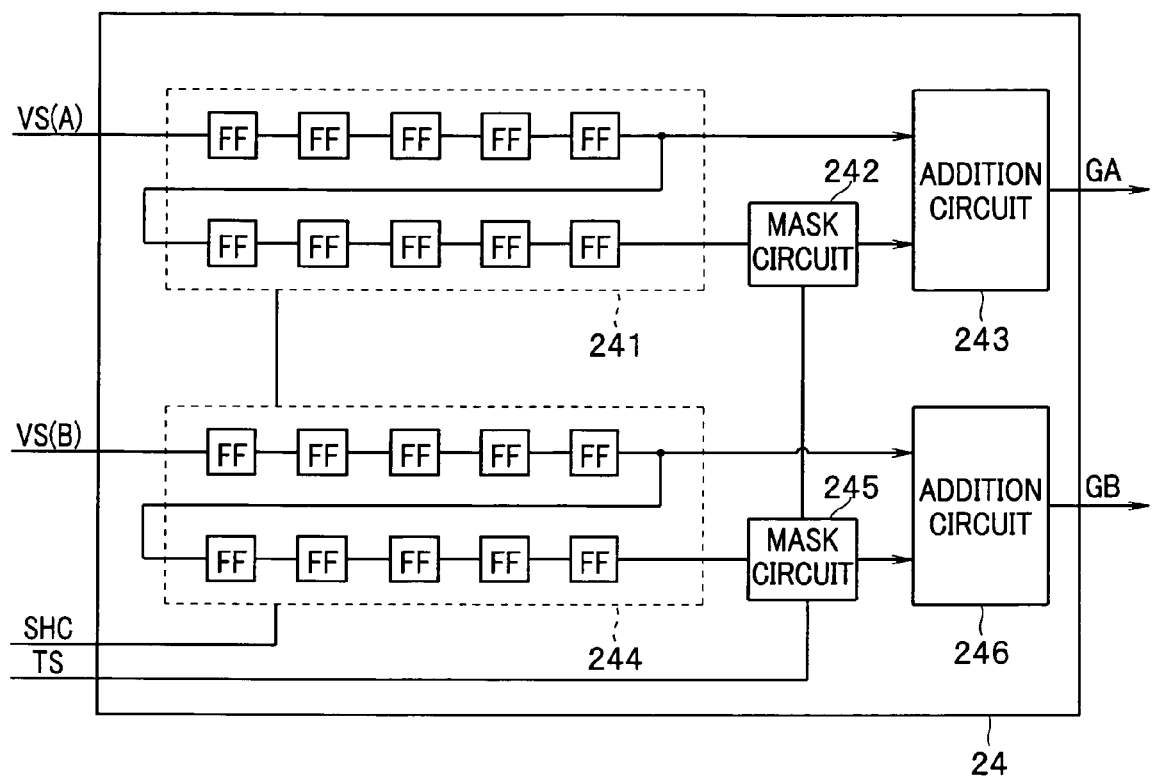
FIG. 5 is a diagram showing a specific example configuration of an inter-frame addition circuit relating to an embodiment of the present invention.

FIG. 5 is a circuit diagram showing the configuration of the inter-frame addition circuit 24. The inter-frame addition circuit 24 is configured to include two shift registers 241 and 244, two mask circuits 242 and 245, and two addition circuits 243 and 246.

The shift registers 241 and 244 of FIG. 5 are respectively configured such that 10 flip flops (hereafter, referred to as FF) are serially connected, and the input signal can be shifted in turn according to the shift signal SHC from the addition practicability determination circuit 23.

The shift register 241 receives the input of the image signals VS of 5 pixels da for focus detection for one line (corresponding to the above described row fd) successively frame by frame. Accordingly, the shift register 241 shown in FIG. 5 can retain a maximum of 2 frames of the image signals VS of the predetermined pixels da for one line, since it is configured to include 10 serially connected FFs.

Moreover, according to the shift register 241 shown in FIG. 5, the fifth FF counting from the input side of the image signal VS of the pixel da is connected to the addition circuit 243, and the tenth FF counting from the input side of the image signal VS of the pixel da is connected to the addition circuit 243 via a mask circuit 242. That is, the shift register 241 shown in FIG. 5 is configured such that when the image signals VS of the predetermined pixels da of for one line in the next (p+1)-th frame are inputted into the first to fifth FFs in a state in which the image signals VS of the predetermined pixels da for one line in the (p−1)-th frame and the p-th frame have already been inputted to the first to the tenth FFs, the image signals VS of the predetermined pixels da for one line in the p-th frame are outputted to the sixth to tenth FFs as well as to the addition circuit 243, and the image signals VS of the predetermined pixels da for one line in the (p−1)-th frame are outputted to the mask circuit 242.

Upon receiving the input of an addition practicability signal TS indicating that the inter-frame addition processing is not to be performed, the mask circuit 242 operates to prevent the image signals VS of the predetermined pixels da for one line in the (p−1)-th frame, which are outputted from the sixth to tenth FFs of the shift register 241, from being inputted to the addition circuit 243. According to such operation of the mask circuit 242, the addition circuit 243 outputs the image signals VS of the predetermined pixels da for one line in the p-th frame as an addition result signal GA. That is, when the defocus quantity is small, the addition circuit 243 outputs the image signals VS for one line as they are as the addition result signal GA without performing the inter-frame addition processing.

Moreover, upon receiving the input of an addition practicability signal TS indicating that the inter-frame addition processing is to be performed, the mask circuit 242 operates to cause the image signals VS of the predetermined pixels da for one line in the (p−1)-th frame, which are outputted from the sixth to tenth FFs of the shift register 241, to be inputted into the addition circuit 243. In accordance with such operation of the mask circuit 242, the addition circuit 243 outputs the result of adding the image signals VS of the predetermined pixels da for one line in the (p−1)-th frame and the image signals VS of the predetermined pixels da for one line in the p-th frame as an addition result signal GA. That is, when the defocus quantity is large, the addition circuit 243 outputs an addition result of adding the image signals VS for one line between two successive frames as an addition result signal GA by performing the inter-frame addition processing.

On the other hand, the shift register 244 receives the inputs of the image signals VS of five pixels db for focus detection for one line (corresponding to the above described row fd) successively frame by frame. Accordingly, the shift register 241 shown in FIG. 5 can retain a maximum of two frames of the image signals VS of the predetermined pixels db for one line since it is configured to include 10 serially connected FFs.

Moreover, according to the shift register 244 shown in FIG. 5, the fifth FF counting from the input side of the image signal VS of the pixel db is connected to the addition circuit 246, and the tenth FF counting from the input side of the image signal VS of the pixel db is connected to the addition circuit 246 via the mask circuit 245. That is, the shift register 244 shown in FIG. 5 is configured such that when the image signals VS of the predetermined pixels db for one line in the next (p+1)-th frame are inputted into the first to the fifth FFs in a state in which the image signals VS of the predetermined pixels db for one line in the (p−1)-th frame and the p-th frame are already inputted into the first to tenth FFs, the image signals VS of the predetermined pixels db for one line in the p-th frame are outputted to the sixth to tenth FFs and to the addition circuit 246, and the image signals VS of the predetermined pixels db for one line in the (p−1)-th frame are outputted to the mask circuit 245.

Upon receiving the input of an addition practicability signal TS indicating that the inter-frame addition processing is not to be performed, the mask circuit 245 operates so as to prevent the image signals VS of the predetermined pixels db for one line in the (p−1)-th frame, which are outputted from the sixth to tenth FFs of the shift register 244, from being inputted into the addition circuit 246. In accordance with such operation of the mask circuit 245, the addition circuit 246 outputs the image signals VS of the predetermined pixels db for one line in the p-th frame as an addition result signal GB. That is, when the defocus quantity is small, the addition circuit 246 outputs the image signals VS for one line as they are as an addition result signal GB without performing the inter-frame addition processing.

Moreover, upon receiving the input of an addition practicability signal TS indicating that the inter-frame addition processing is to be performed, the mask circuit 245 operates to cause the image signals VS of the predetermined pixels db for one line in the (p−1)-th frame, which are outputted from the sixth to tenth FFs of the shift register 244, to be inputted into the addition circuit 246. In accordance with such operation of the mask circuit 245, the addition circuit 246 outputs the result of adding the image signals VS of the predetermined pixels db for one line in the (p−1)-th frame and the image signals VS of the predetermined pixels db for one line in the p-th frame as an addition result signal GB. That is, when the defocus quantity is large, the addition circuit 246 outputs an addition result obtained by adding the image signals VS for one line between two successive frames as an addition result signal GB by performing the inter-frame addition processing.

Note that according to the present embodiment, when applying the inter-frame addition processing to the pixel signals outputted from the pixels for focus detection, the addition circuit 246 is not necessarily configured such that two successive frames are always added, but may also be configured such that the number of frames of the object to be added is selectively changeable.

Figure 6:
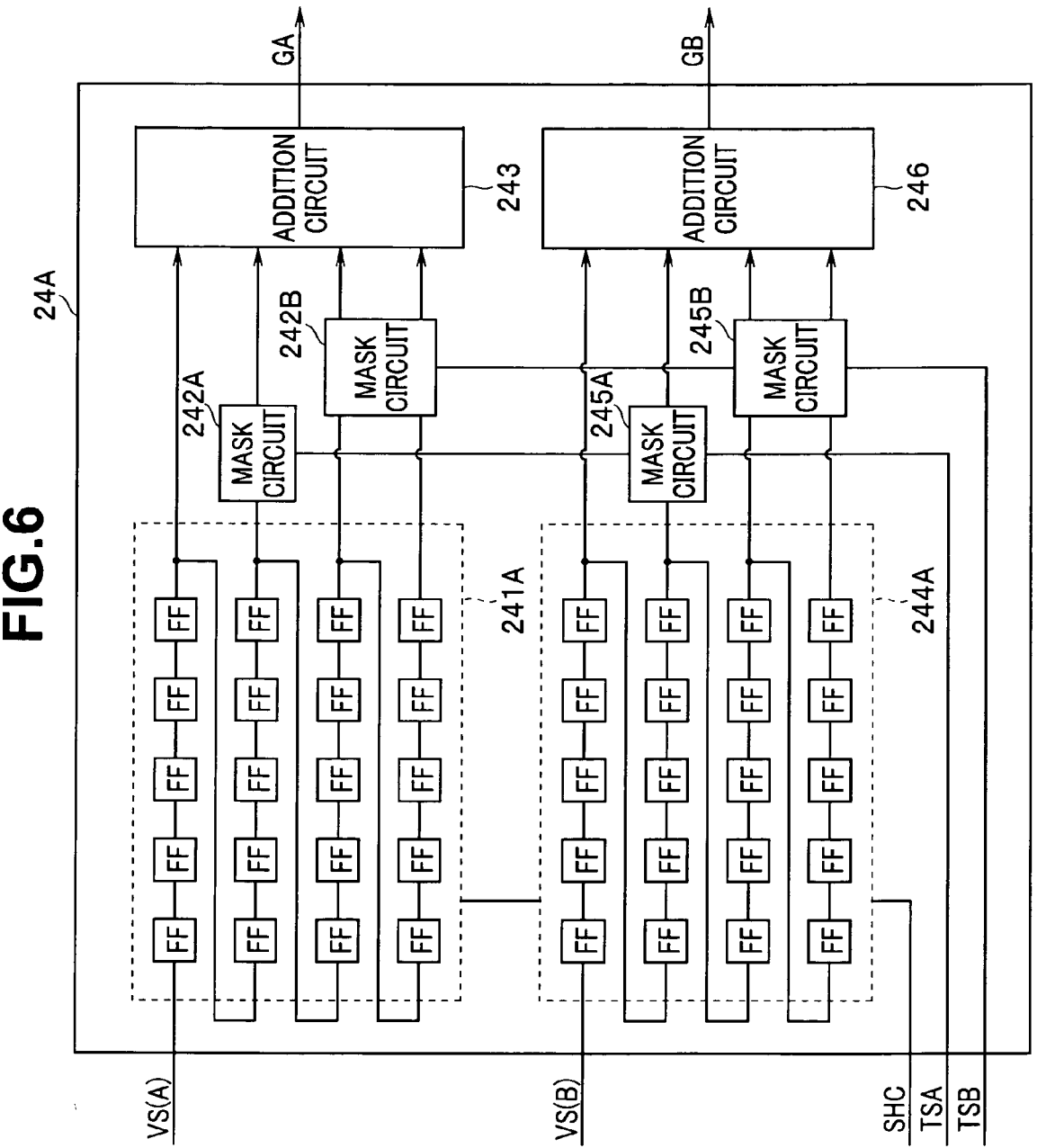
FIG. 6 is a diagram showing another specific example configuration, which is different from FIG. 5, of the inter-frame addition circuit relating to the embodiment of the present invention.

According to the inter-frame addition circuit 24A, for example, as shown in FIG. 6, it is configured such that the number of frames to be used for the inter-frame addition processing can be selected to be any of 1 to 4.

The shift registers 241A and 244A of the inter-frame addition circuit 24A are respectively configured such that 20 FFs are serially connected, and input signals can be shifted in turn according to a shift signal SHC from the addition practicability determination circuit 23.

That is, the shift register 241A shown in FIG. 6 can retain a maximum of 4 frames of the image signals VS of the predetermined pixels da for one line. Moreover, the shift register 244A shown in FIG. 6 can retain a maximum of 4 frames of the image signals VS of the predetermined pixels db for one line.

According to the shift register 241A shown in FIG. 6, the fifth FF counting from the input side of the image signal VS of the pixel da is connected to the addition circuit 243; the tenth FF counting from the input side of the image signal VS of the pixel da is connected to the addition circuit 243 via the mask circuit 242A; and the fifteenth and twentieth FFs counting from the input side of the image signal VS of the pixel da are connected to the addition circuit 243 via the mask circuit 242B. That is, the shift register 241A shown in FIG. 6 is configured such that when the image signals VS of the predetermined pixel da for one line in the next (q+1)-th frame are inputted into the first to the fifth FFs in a state in which the image signals VS of the predetermined pixels da for one line in the (q−3)-th frame to the q-th frame are already inputted into the first to twentieth FFs, the image signals VS of the predetermined pixels da for one line in the (q−3)-th frame are outputted to the mask circuit 242B; the image signals VS of the predetermined pixels da for one line in the (q−2)-th frame are outputted to the sixteenth to twentieth FFs and to the mask circuit 242B; the image signals VS of the predetermined pixels da for one line in the (q−1)-th frame are outputted to the eleventh to fifteenth FF and to the mask circuit 242A; and the image signals VS of the predetermined pixels da for one line in the q-th frame are outputted to the sixth to tenth FFs and to the addition circuit 243.

Upon detecting an addition practicability signal TSA indicating that the number of frames to be used for the inter-frame addition processing in the addition circuit 243 is 1 (synonymous with that the inter-frame addition processing is not to be performed) or 3, the mask circuit 242A operates so as to prevent the image signals VS of the predetermined pixels da for one line in the (q−1)-th frame, which are outputted from the sixth to tenth FFs of the shift register 241A, from being inputted into the addition circuit 243. Moreover, upon detecting an addition practicability signal TSA indicating that the number of frames to be used for the inter-frame addition processing in the addition circuit 243 is 2 or 4, the mask circuit 242A operates so as to cause the image signals VS of the predetermined pixels da for one line in the (q−1)-th frame, which are outputted from the sixth to the tenth FF of the shift register 241A, to be inputted into the addition circuit 243.

Upon detecting an addition practicability signal TSB indicating that the number of frames to be used for the inter-frame addition processing in the addition circuit 243 is 1 (synonymous with that the inter-frame addition processing is not to be performed) or 2, the mask circuit 242B operates so as to prevent the image signals VS of the predetermined pixels da for one line in the (q−3)-th frame and the (q−2)-th frame, which are outputted from the eleventh to twentieth FFs of the shift register 241A, from being inputted into the addition circuit 243. Moreover, upon detecting an addition practicability signal TSB indicating that the number of frames to be used for the inter-frame addition processing in the addition circuit 243 is 3 or 4, the mask circuit 242B operates so as to cause the image signals VS of the predetermined pixels da for one line in the (q−3)-th frame and the (q−2)-th frame, which are outputted from the eleventh to twentieth FFs of the shift register 241A, to be inputted into the addition circuit 243.

That is, when the defocus quantity is relatively small, the addition circuit 243 of the inter-frame addition circuit 24A outputs the image signals VS of the predetermined pixels da for one line in the q-th frame as they are as an addition result signal GA without performing the inter-frame addition processing. Moreover, when the defocus quantity is relatively large, the addition circuit 243 of the inter-frame addition circuit 24A outputs an addition result obtained by performing the inter-frame addition processing of the number of frames according to the magnitude of the defocus quantity on the image signals VS of the predetermined pixels da for one line in the (q−3)-th frame to the q-th frame, as the addition result signal GA.

On the other hand, according to the shift register 244A shown in FIG. 6, the fifth FF counting from the input side of the image signal VS of the pixel db is connected to the addition circuit 246; the tenth FF counting from the input side of the image signal VS of the pixel db is connected to the addition circuit 246 via the mask circuit 245A; and the fifteenth and the twentieth FFs counting from the input side of the image signal VS of the pixel db are connected to the addition circuit 246 via the mask circuit 245B. That is, the shift register 244A shown in FIG. 6 is configured such that when the image signals VS of the predetermined pixels db for one line in the next (q+1)-th frame are inputted into the first to the fifth FFs in a state in which the image signals VS of the predetermined pixels db for one line in the (q−3)-th frame to the q-th frame are already inputted to the first to the twentieth FFs, the image signals VS of the predetermined pixels db for one line in the (q−3)-th frame are outputted to the mask circuit 245B; the image signals VS of the predetermined pixels db for one line in the (q−2)-th frame are outputted to the sixteenth to twentieth FFs and to the mask circuit 245B; the image signals VS of the predetermined pixels db for one line in the (q−1)-th frame are outputted to the eleventh to the fifteenth FFs and to the mask circuit 245A; and the image signals VS of the predetermined pixels db for one line in the q-th frame are outputted to the sixth to the tenth FFs and to the addition circuits 246.

Upon detecting an addition practicability signal TSA indicating that the number of frames to be used for the inter-frame addition processing in the addition circuit 246 is 1 (synonymous with that the inter-frame addition processing is not to be performed) or 3, the mask circuit 245A operates so as to prevent the image signals VS of the predetermined pixels db for one line in the (q−1)-th frame, which are outputted from the sixth to tenth FFs of the shift register 244A, from being inputted into the addition circuit 246. Moreover, upon detecting an addition practicability signal TSA indicating that the number of frames to be used for the inter-frame addition processing in the addition circuit 246 is 2 or 4, the mask circuit 245A operates so as to cause the image signals VS of the predetermined pixels db for one line in the (q−1)-th frame, which are outputted from the sixth to the tenth FFs of the shift register 244A, to be inputted into the addition circuit 246.

Upon detecting an addition practicability signal TSB indicating that the number of frames to be used for the inter-frame addition processing in the addition circuit 246 is 1 (synonymous with that the inter-frame addition processing is not to be performed) or 2, the mask circuit 245B operates so as to prevent the image signals VS of the predetermined pixels db for one line in the (q−3)-th frame and the (q−2)-th frame, which are outputted from the eleventh to twentieth FFs of the shift register 244A, from being inputted into the addition circuit 246. Moreover, upon detecting an addition practicability signal TSB indicating that the number of frames to be used for the inter-frame addition processing in the addition circuit 246 is 3 or 4, the mask circuit 245B operates so as to cause the image signals VS of the predetermined pixels db for one line in the (q−3)-th frame and the (q−2)-th frame, which are outputted from the eleventh to twentieth FFs of the shift register 244A, to be inputted into the addition circuit 246.

That is, when the defocus quantity is relatively small, the addition circuit 246 of the inter-frame addition circuit 24A outputs the image signals VS of the predetermined pixels db for one line in the q-th frame as they are as an addition result signal GB without performing the inter-frame addition processing. Moreover, when the defocus quantity is relatively large, the addition circuit 246 of the inter-frame addition circuit 24A outputs an addition result obtained by performing the inter-frame addition processing of the number of frames according to the magnitude of the defocus quantity on the image signals VS of the predetermined pixels db for one line in the (q−3)-th frame to the q-th frame, as the addition result signal GB.

Note that, the inter-frame addition circuits 24 and 24A of the present embodiment may be configured such that each shift register is replaced with a frame memory.

Referring back to FIG. 2, the correlation computing control circuit 25 generates and outputs a control signal SS for controlling the timing of correlation computation, etc. in the correlation computing circuit 26 based on the correlation timing signal TC from the image pickup device driving circuit 12.

The correlation computing circuit 26 performs correlation computation according to addition result signals GA and GB outputted from the inter-frame addition circuit 24 (or the inter-frame addition circuit 24A) based on the control according to the control signal SS. Moreover, the correlation computing circuit 26 outputs the computation result obtained by the correlation computation, as a correlation computation result signal CS.

Note that in the present embodiment, known correlation computing circuits, the configuration of which is appropriately rearranged, may be used as the correlation computing circuit 26. Accordingly, description on the concrete configuration of the correlation computing circuit 26 will be omitted.

By the way, when the illuminance of an object is low, or a large defocus takes place, etc., there is a tendency that the amplitude value (wave height value) of a pixel signal outputted from a pixel pair for focus detection decreases and the S/N ratio of the pixel signal decreases as well. Thus, for example, when correlation computation is performed by using a pixel signal with a low S/N ratio as it is, errors become more likely to occur in the correlation computation, and thereby it becomes unable to perform appropriate focus detection, resulting in a problem that the operation of the AF function becomes unstable.

For example, when the amplitude value of the pixel signal outputted from the pixel pair for focus detection is low, since simply increasing the gain of the pixel signal will concurrently amplify the amplitude value of the noise included in the pixel signal, there will be little improvement in the S/N ratio compared with in the pixel signal before amplification and it is unable to obtain image signals suitable for the focus detection by correlation computation.

On the other hand, for example, when the amplitude value of the pixel signal outputted from a pixel pair for focus detection is low, adding a plurality of signals of surrounding pixels, which are outputted into one frame from the pixel pair, will increase the amplitude value in the pixel signal after the addition compared with that before the addition, but in the meantime will decrease a high-frequency component quantity included in the signal after the addition; therefore, it is unable to perform accurate focus detection according to the defocus quantity.

In contrast to this, according to the present embodiment, even when the amplitude value of the pixel signal outputted from a pixel pair for focus detection is low, that is, the S/N ratio of the pixel signal outputted from the pixel pair for focus detection is low, it is possible to perform correlation computation by using a pixel signal, the S/N ratio of which is improved compared with that before the addition, by adding pixel signals obtained between a plurality of frames according to the magnitude of the high-frequency component quantity. Thus, according to the present embodiment, it is possible to suppress the occurrence of errors in the computation result of correlation computation at the time of focus detection.

Moreover, according to the present embodiment, even in the configuration in which pixel pairs for focus detection are provided only in one line of the image pickup plane 11a of the image pickup device 11 as exemplified in FIG. 3, it is surely possible to suppress the occurrence of errors in the computation result of correlation computation at the time of focus detection. Thus, according to the present embodiment, it is possible to increase the number of pixels for photographing which can be disposed in the image pickup device, consequently improving the image quality when photographing an object.

Note that the above described present embodiment may be applied, without being limited to digital cameras, to other image pickup apparatuses, such as monitoring cameras and endoscopes.

By the way, in the image pickup apparatus of the present embodiment described above, the practicability of the inter-frame addition processing (or the number of frames to be used for the inter-frame addition processing) is determined based on the quantity of a high-frequency component included in the image signals VS of a plurality of pixel pairs for focus detection, or based on the quantity of a high-frequency component included in the image signals VS of a plurality of pixels for photographing of the image pickup device 11.

Here, the configuration may be such that a high-frequency component quantity is used as an analysis result of the signal component of an object image and, for the purpose of confirming the analysis result, an average luminance value of a plurality of pixels for photographing of the image pickup device 11 is used in conjunction therewith.

Moreover, according to the present embodiment described above, the plurality of pixel pairs for focus detection are not necessarily provided on the image pickup device for photographing an object, but may be provided separately from such image pickup device.

Figure 7:
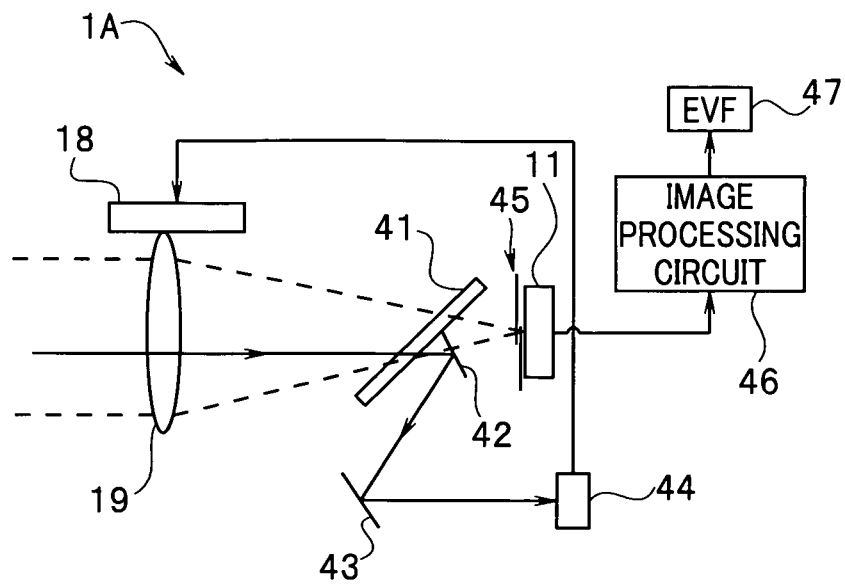
FIG. 7 is a diagram to illustrate the configuration of an image pickup apparatus relating to a variant embodiment of the present invention.

FIG. 7 is a diagram to illustrate the configuration of the image pickup apparatus 1A relating to a variant of the present embodiment. Note that the same components in FIG. 7 as those of FIG. 1 are given the same reference characters thereby omitting the description thereof. As shown in FIG. 7, the light incoming from the optical imaging system 19 of the image pickup apparatus 1A, which is a digital camera, strikes a sub-mirror 42 provided in a mirror 41 having a half mirror to be reflected. The reflected light from the sub-mirror 42 is further reflected at a sub-mirror 43, and is received by a sensor 44 including a plurality of pixel pairs for focus detection and a correlation computing section. The sensor 44 outputs a defocus quantity DF in accordance with the detected phase difference.

When photographing of an object is performed, the mirror 41 is moved up and a shutter 45 is driven so that light from the object enters into an image pickup device 11A. The image pickup device 11A does not include a plurality of pixel pairs for focus detection. The image signal VS from the image pickup device 11A is inputted into an image processing section 46 to be recorded in a recording medium not shown, and is further outputted to, for example, an electronic view finder (EVF) 47, so that a photographed object image is displayed.

Figure 8:
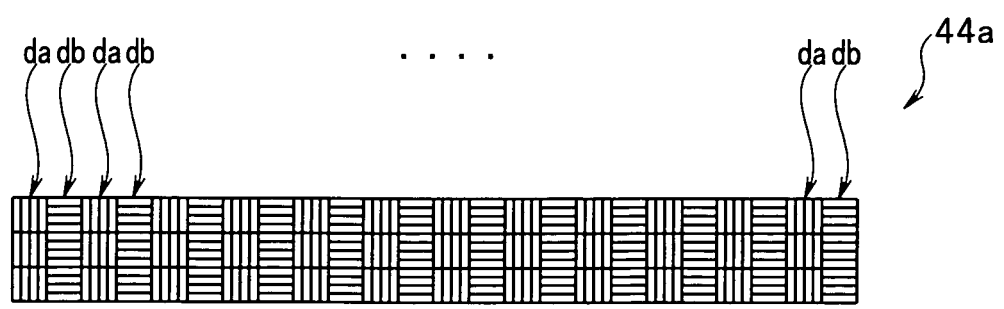
FIG. 8 is a schematic diagram to illustrate the pixel array of a plurality of pixel pairs for focus detection in the image pickup plane of a sensor relating to a variant embodiment of the present invention.

FIG. 8 is a schematic diagram to illustrate the pixel arrays of a plurality of pixel pairs for focus detection in an image pickup plane of the sensor 44. As shown in FIG. 8, a plurality of pixel pairs for focus detection are arranged in a matrix form over a plurality of rows (three rows in this case) in the image pickup plane 44a of the sensor 44.

Thus, even when an image pickup apparatus 1A having such a configuration is used, it is possible to suppress the occurrence of errors in the computation result of the correlation computation at the time of focus detection, and to improve the image quality when photographing an object.

The present invention will not be limited to each embodiment described above and may be subjected to various changes and modifications within the scope not departing from the spirit of the present invention.

What is claimed is:

1. An image pickup apparatus, comprising:
an optical imaging system for forming an object image;
an image pickup device including a plurality of pixels that photoelectrically converts the object image;
a defocus quantity calculation section for calculating a defocus quantity based on a phase difference between a plurality of signals for focus detection obtained from a plurality of pixels for focus detection that respectively receive a light flux that passes through a different pupil region of the optical imaging system;
a focusing section for driving the optical imaging system so as to achieve an in-focus state, in accordance with the defocus quantity calculated at the defocus quantity calculation section;
an addition practicability determination section for determining a practicability of performing inter-frame addition on the plurality of signals for focus detection before calculating the defocus quantity, based on an analysis result of a signal component of the object image; and
an inter-frame addition processing section for performing inter-frame addition on the plurality of signals for focus detection based on a determination result of the addition practicability determination section, wherein
the analysis result is a quantity of a high frequency component included in the plurality of signals for focus detection obtained from the plurality of pixels for focus detection.

2. The image pickup apparatus according to claim 1, wherein
the addition practicability determination section determines the practicability of the performance of inter-frame addition on the plurality of signals for focus detection, and a number of addition frames when performing inter-frame addition on the plurality of signals for focus detection, respectively, based on a comparison result of comparing the analysis result with one or more thresholds.

3. The image pickup apparatus according to claim 1, wherein
the plurality of pixels for focus detection are included in the image pickup device.

4. The image pickup apparatus according to claim 1, wherein
the pixels for focus detection are pixels included in a sensor which is provided separately from the image pickup device.

5. The image pickup apparatus according to claim 1, wherein
the plurality of signals for focus detection are video signals of a motion picture.

* * * * *